United States Patent
Gordon et al.

(10) Patent No.: US 9,248,802 B2
(45) Date of Patent: Feb. 2, 2016

(54) SURFACE MOUNT INITIATORS

(71) Applicants: Scott C. Gordon, Hyde Park, UT (US);
Alan R. Larsen, Layton, UT (US);
Jeffery Kida, Layton, UT (US)

(72) Inventors: Scott C. Gordon, Hyde Park, UT (US);
Alan R. Larsen, Layton, UT (US);
Jeffery Kida, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/261,040

(22) Filed: Apr. 24, 2014

(65) Prior Publication Data
US 2015/0307058 A1 Oct. 29, 2015

(51) Int. Cl.
*B60R 21/264* (2006.01)
*B60R 21/00* (2006.01)
*B60R 21/16* (2006.01)
*B60R 21/01* (2006.01)
*B60R 21/26* (2011.01)

(52) U.S. Cl.
CPC ............ *B60R 21/264* (2013.01); *B60R 21/00* (2013.01); *B60R 21/16* (2013.01); *B60R 2021/01006* (2013.01); *B60R 2021/26029* (2013.01)

(58) Field of Classification Search
CPC .............. B60R 21/164; B60R 2021/01006; B60R 2021/01211; B60R 2021/01225; B60R 2021/01231; B60R 21/264; B60R 21/16; B60R 2021/26029
USPC ........................................ 102/202.14, 202.9
See application file for complete search history.

(56) References Cited

U.S. PATENT DOCUMENTS

| | | | |
|---|---|---|---|
| 5,672,841 A | 9/1997 | Monk et al. | |
| 5,831,203 A * | 11/1998 | Ewick | 102/202.5 |
| 5,932,832 A * | 8/1999 | Hansen et al. | 102/202.4 |
| 6,068,291 A | 5/2000 | Lebaudy et al. | |
| 6,408,758 B1 * | 6/2002 | Duguet | 102/202.2 |
| 6,447,007 B1 * | 9/2002 | DiGiacomo et al. | 280/741 |
| 6,508,175 B1 | 1/2003 | Avetisian | |
| 6,640,718 B2 | 11/2003 | Duguet et al. | |
| 2002/0002924 A1 | 1/2002 | Duguet et al. | |
| 2002/0050703 A1 * | 5/2002 | Whang et al. | 280/737 |
| 2003/0184068 A1 | 10/2003 | Nakashima et al. | |
| 2004/0083919 A1 * | 5/2004 | Hosey et al. | 102/202.12 |
| 2008/0211215 A1 | 9/2008 | Hoffman et al. | |

FOREIGN PATENT DOCUMENTS

| | | |
|---|---|---|
| EP | 0 879 739 B1 | 11/1998 |
| EP | 1 160 533 B1 | 12/2001 |

OTHER PUBLICATIONS

Co-pending U.S. Appl. No. 13/688,893, filed Nov. 29, 2012; inventors Dario G. Brisighella, Jr. et al.; title: Duplex Actuation System for Inflatable Restraints.
Co-pending U.S. Appl. No. 13/688,893; filed Nov. 29, 2012; inventors Bradley W. Smith et al.; title: Duplex Firing Inflator.

* cited by examiner

*Primary Examiner* — Stephen M Johnson
(74) *Attorney, Agent, or Firm* — Pauley Erickson & Kottis (57) ABSTRACT

An initiator assembly includes an SMI assembly board onto which at least a first and a second initiator are surface mounted. The first and second initiators each include a respective surface mount initiator board with which a respective igniter element is respectively mounted. Corresponding multi-initiator assemblies for automotive airbag inflator devices as well as automotive airbag inflator device combinations are also provided.

22 Claims, 10 Drawing Sheets

PRIOR ART

SURFACE MOUNT INITIATORS

CROSS REFERENCE TO RELATED APPLICATIONS

The subject matter of this application is related to prior U.S. patent application Ser. No. 13/688,839, filed on 29 Nov. 2012 and prior U.S. patent application Ser. No. 13/688,893, now U.S. Pat. No. 9,010,803, filed on 29 Nov. 2012. The disclosure of each of these related patent applications is hereby incorporated by reference herein and made a part hereof, including but not limited to those portions which specifically appear hereinafter.

BACKGROUND OF THE INVENTION

1. Field of the Invention

This invention relates generally to initiators and, more particularly, to design, fabrication and processing of initiators such as described more fully below, such as sometimes herein as "surface mountable" or "surface mounted."

2. Discussion of Related Art

Initiators find common usage in a variety of applications. One prominent use of initiators is in motor vehicle occupant safety restraint systems.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Various types of inflator devices have been disclosed in the art for the inflation of an airbag such as used in inflatable restraint systems.

One type of known inflator device derives inflation gas from a combustible pyrotechnic gas generating material which, upon ignition, generates a quantity of gas sufficient to inflate the airbag. Such inflator devices often include a gas generant material stored within the inflator device housing and an initiator in combination with the housing that actuates the gas generant material. The initiator typically includes a reactive charge in combination with electrical connectors. A signal sent through the electrical connector(s) actuates the reactive charge, which produces reaction products that actuate the gas generant material.

In view of possibly varying operating conditions and, in turn, possibly varying desired performance characteristics, inflatable safety restraint technology has led to the development of what has been termed "adaptive" or "Smart" inflator devices and corresponding inflatable restraint systems. With an adaptive inflator device, output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Pyrotechnic inflators typically may have one or more chambers containing gas generant. Adaptive pyrotechnic inflators having gas generant material in two chambers, which are independently ignited via respective initiators or igniters, have been referred to as "dual stage" inflators. In practice, each such gas generant material-containing chamber is oftentimes referred to as a "combustion chamber" as the gas generant material therein contained is burned or otherwise reacted to produce or form gas such as may be used to inflate an associated inflatable restraint airbag cushion.

Dual stage inflators typically may have several contemplated actuation or firing scenarios. In a first such scenario, only the gas generant material in a first or primary chamber and associate initiator device is actuated whereby a fixed quantity of inflation gas is produced thereby. In a second possible scenario, the first or primary initiator is first actuated whereby gas generant material in a first chamber is first reacted to start to produce or form inflation gas and after a predetermined or preselected delay, a secondary initiator is then actuated whereby gas generant material in the second chamber is reacted to also produce or form inflation gas. In a third possible scenario, both the primary and the secondary initiators are actuated whereby a gas generant material in a first chamber and a gas generant material in a second chamber are actuated simultaneously to produce or form inflation gas from the gas generant material in each of the chambers.

Through the selection and use of an appropriate such actuation or firing scenario, inflator output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Current state of the art automotive airbag technology oftentimes employs dual stage inflators (smart inflators) in an effort to achieve desired or necessary performance requirements.

Figure 1:
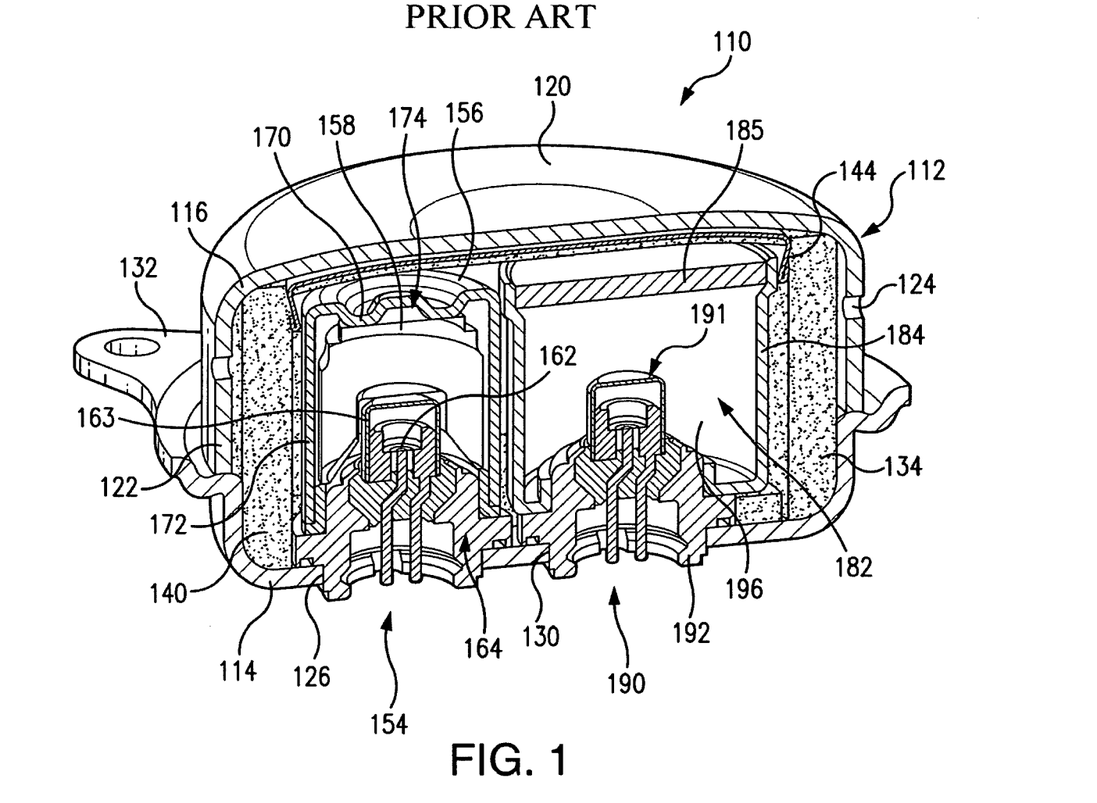
FIG. 1 is a sectional view of a dual stage inflator that is known and available in the art.

FIG. 1 shows a n example of a dual stage inflator assembly, generally designated by the reference numeral 110, and shown in a static state or condition, e.g., prior to actuation.

The inflator assembly 110 includes a housing construction 112 having a generally cylindrical external outline and such as formed of two structural components, i.e., a lower shell or base portion 114 and an upper shell or diffuser cap portion 116. The diffuser cap portion 116 is in the general form of an inverted bowl and includes a top wall 120 and a cylindrical sidewall 122, which includes a plurality of spaced, preferably, generally uniformly spaced gas exit ports 124.

The base portion 114 includes first and second mounting openings, designated by the reference numerals 126 and 130, respectively. The base portion 114 also includes a peripheral bracket 132 that extends radially outward from the housing 112 and such as may serve to form an interface attachment which is used to attach the inflator assembly 110 to a vehicle.

The housing 112 is configured to define a central first chamber 134. The first chamber 134 contains or houses a supply of a first gas generant material, such as typically in the form of a pyrotechnic, not here shown to facilitate illustration and comprehension.

Within the first chamber 134, such as in surrounding relation with the first gas generant material therein contained, is a filter assembly 140. Such a filter assembly may include one or more of a combustion screen or filter such as formed of multiple layers or wraps of a metal screen, a filter damper pad or the like.

The inflator assembly 110 also includes a retainer 144 such as may serve as a construction expedient to retain the inflator assembly components in proper relative arrangement and prevent undesired flow passage through the assembly.

A first igniter assembly, generally designated by the reference numeral 154, is mounted to the housing 112 in a location within the first chamber 134 via the first mounting opening 126. The first igniter assembly 154 may take the form of a known pyrotechnic initiator device such as includes, as is known in the art, an igniter or ignition booster cup 156 wherein is housed a canister 158, such as contains an igniter material, not here shown to facilitate illustration and comprehension. The first igniter assembly also includes a first igniter device or squib 162 in conjunction with an initiator pyrotechnic output composition (not shown), a pyrotechnic output composition containment cup and electrical isolation sleeve 163, such as made of metal, and a squib adapter or holder 164 whereby the igniter assembly 154 is mounted to or mated with the housing 112. As shown, the igniter cup 156 can take the form of a generally concave member with a cap 170 and a cylindrical sidewall 172 forming an interior 174. The igniter cup 156 can be formed of a gas-impermeable material, such as metal, with the cylindrical sidewall 172 including a plurality of positioned and spaced gas exit orifices (not shown) that are normally (e.g., when the inflator is in a static or prior to actuation state) covered and the passage of material therethrough prevented by means of a pressure sensitive covering or barrier (not shown), such as by means of an adhesive-backed foil seal wrap or the like as is well known in the art. As is known, such covering can be selected to open or rupture upon the application of a predetermined pressure thereagainst from the interior of the igniter cup 156.

When actuated, the squib 162 discharges or otherwise results in the rupture or opening of the ignition material canister 158 and, in turn, ignition of the igniter material normally contained and subsequently the gas generant material contained within the first chamber 134.

In practice, the igniter assembly 154 is connected or joined to the housing 112 such as by welding the holder 164 to the base portion 114 at the mounting opening 126.

The first chamber 134 also houses or contains a second chamber 182. The second chamber 182 includes a generant cup 184, a lid closure 185, a second igniter device or squib 190 in conjunction with an initiator pyrotechnic output composition (not shown), a pyrotechnic output composition containment cup and electrical isolation sleeve 191, such as made of metal, and a second squib adapter or holder 192 whereby the second igniter device 190 and the associated second chamber 182 are mounted or mated with the housing 112 such as via the second mounting opening 130.

The generant cup 184 and the lid closure 185 cooperate to form a generant cup interior 196 wherein is desirably placed a selected quantity of a second gas generant material such as typically in the form of a pyrotechnic as described above and not here shown to facilitate illustration and comprehension. The second gas generant material may typically be in the form of a pyrotechnic material and may be either the same or different in composition, shape, size or form, as compared to the first gas generant material.

The generant cup 184 and the lid closure 185 further desirably cooperate and function in a manner such as to permit the combustion products formed by reaction of the gas generant material contained within the second chamber 182, when properly and desirably actuated, to pass from the second chamber 182 out into the first chamber 134, through the filter assembly 140 and the exit ports 124 out from the inflator assembly 110 and into an associated airbag cushion (not shown). Zone Name: A2,AMD As will be appreciated, there is a need and demand for improvements in multiple initiator-containing devices and associated assemblies. Previous initiator and inflator devices include those described and/or claimed in EP 0 879 739 B1 (having the counterpart U.S. Pat. No. 6,068, 291, issued 30 May 2000 to Lebaudy et al.); EP 1 160 533 B1 (having the counterpart US 2002/0002924 A1, published 10 Jan. 2002); and U.S. Pat. No. 5,672,841, issued 30 Sep. 1997 to Monk et al.

In view of the numerous and/or varied uses and applications for initiators, improvements in the design, manufacture, operation and/or processing of initiators, such as whereby significant cost reductions can be realized, are highly sought, pursued and valued.

SUMMARY OF THE INVENTION

A general object of the invention is to provide improved initiator assemblies.

A more specific objective of the invention is to overcome one or more of the problems described above.

In one aspect of the invention, there is provided an initiator assembly that includes a surface mount or surface mountable initiator (SMI) assembly board onto which at least a first and a second initiator are surface mounted. The first initiator includes a first container closed by a first solid body. The first container contains a supply of a first igniter material. The first initiator also includes a first igniter element disposed within the first container. Upon actuation, the first igniter element is in reaction initiating communication with the first igniter material. The first initiator further includes a first surface mount initiator board disposed between the first igniter element and the first solid body. First and second electrical contacts of the first initiator pass through the first solid body and the first surface mount initiator board in electrical contact with the first igniter element. The second initiator includes a second container closed by a second solid body. The second container contains a supply of a second igniter material. The second initiator includes a second igniter element disposed within the second container. Upon actuation, the second igniter element is in reaction initiating communication with the second igniter material. The second initiator further includes a second surface mount initiator board disposed between the second igniter element and the second solid body. First and second electrical contacts of the second initiator pass through the second solid body and the second surface mount initiator board in electrical contact with the second igniter element.

In specific embodiments of such initiators assemblies:
1. the first and/or the second initiator is/are wave soldered to the SMI initiator board;
2. the first and/or the second igniter element(s) is/are reflow soldered to respective surface mount devices;
3. the first and/or the second igniter element(s) is/are selected from a group that includes a hot wire, a foil bridge and a thin film;
4. the first and/or the second igniter materials is an ignition pyrotechnic; and
5. the initiator assembly is a part, component or in combination in or with an automotive airbag inflator device.

In another aspect of the invention, there is provided a multi-initiator assembly for an automotive airbag inflator device. In accordance with one embodiment, such a multi-initiator assembly includes an SMI initiator board onto which a plurality of initiators are surface mounted. The plurality of initiators includes at least a first initiator and a second initiator. The first initiator includes a first container closed by a first solid body. The first container contains a supply of a first igniter material. The first initiator also includes a first igniter element disposed within the first container. Upon actuation, the first igniter element is in reaction initiating communication with the first igniter material. The first initiator further includes a first surface mount initiator board disposed between the first igniter element and the first solid body. First and second electrical contacts of the first initiator pass through the first solid body and the first surface mount initiator board in electrical contact with the first igniter element. The second initiator includes a second container closed by a second solid body. The second container contains a supply of a second igniter material. The second initiator also includes a second igniter element disposed within the second container. Upon actuation, the second igniter element is in reaction initiating communication with the second igniter material. The second initiator further includes a second surface mount initiator board disposed between the second igniter element and the second solid body. First and second electrical contacts of the second initiator pass through the second solid body and the second surface mount initiator board in electrical contact with the second igniter element.

As used herein, references to a "surface mount initiator", "surface mountable initiator" or "SMI" are to be generally understood to refer to an initiator which includes or wherein connector lead features are directly mounted or disposed onto an associated plate or board, such as a PC board, for example.

Other objects and advantages will be apparent to those skilled in the art from the following detailed description taken in conjunction with the appended claims and drawings.

DESCRIPTION OF PREFERRED EMBODIMENTS

The present invention provides improved initiator assemblies and associated initiator-containing combinations such as including automotive airbag inflator devices such as for use in motor vehicle occupant safety restraint systems, for example.

As described in greater detail below, SMI initiator assemblies with connector lead features directly mounted or disposed onto an associated plate or board, such as a PC board, for example, open up new options for initiating device integrated into an assembly and can offer processing advantages that cannot be attained or realized by, through, or with conventional initiator assemblies.

Figure 2:
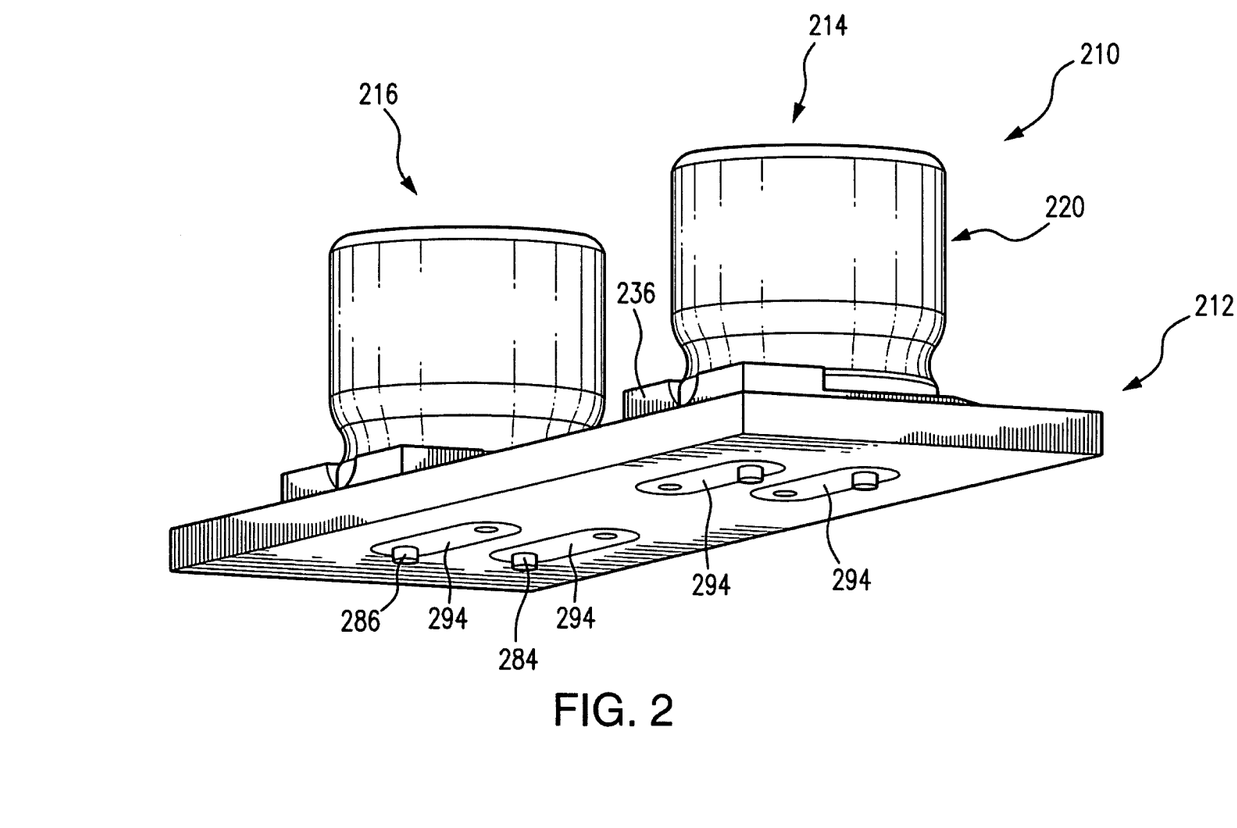
FIG. 2 is a simplified perspective view of an initiator assembly in accordance with one embodiment of the invention.
Figure 3:
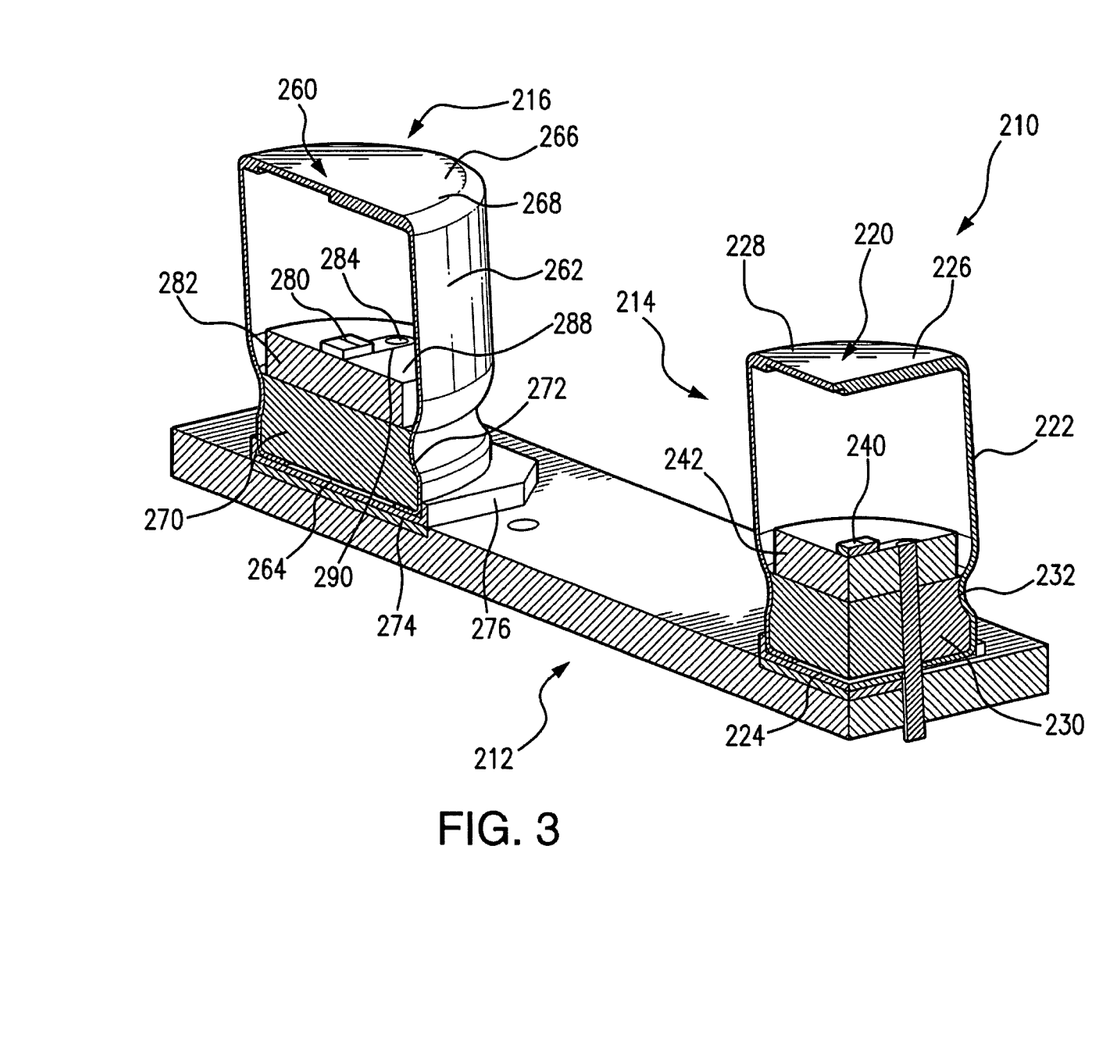
FIG. 3 is a simplified sectional perspective view of the initiator assembly shown in FIG. 2.
Figure 4:
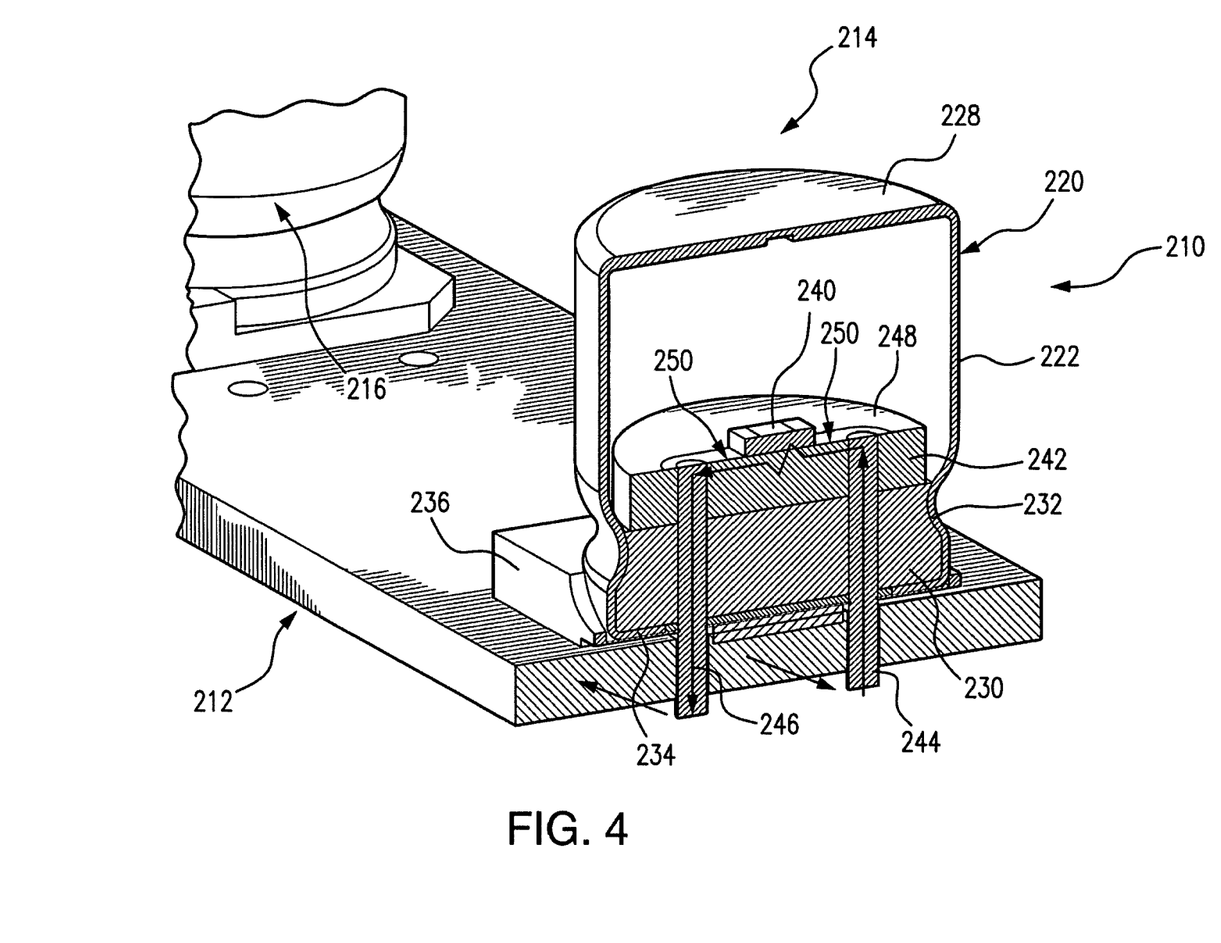
FIG. 4 is another simplified sectional perspective view of the initiator assembly shown in FIG. 2 and further showing the electric circuit provided by one of the initiators thereof.

Turning first to FIGS. 2-4, there is shown or illustrated an initiator assembly, generally designated by the reference numeral 210, in accordance with one embodiment of the invention.

The initiator assembly 210 includes an SMI initiator board 212 onto which at least a first and a second initiator, 214 and 216, respectively, are surface mounted.

The first initiator 214 includes a fragmentable generally cylindrical first container 220. The first container 220 includes a generally cylindrical side wall 222 with an open first end 224 generally opposite a closed second end 226. As shown, the second end 226 can be closed by generally planar upper wall 228. A first solid cylindrical body 230 closes the container open end 224. The body 230 has a side wall 232 adapted to mate with the container side wall 222. Adjacent the container open end 224, the container side wall 222 includes a lip portion 234 such as extends about the solid body 230 in a closure securing or retaining alignment.

Advantageously, the container 220 comprises a thin, light metal such as aluminum. The container planar upper wall 228 can, if desired, include weakened lines or areas (not shown) in order to be able to more easily and specifically open under the effect of an increase in the pressure within the container.

The first container 220 contains a supply of a first igniter material such as in the form of an ignition pyrotechnic, not shown to facilitate illustration and comprehension of the drawing. Various igniter materials such as known in the art can be used and broader practice of the invention is not necessarily limited by or to the use of specific igniter materials.

As will be appreciated by those skilled in the art and guided by the teachings herein provided, suitable such first containers and first solid bodies can take various shapes and forms and the broader practice of the invention is not necessarily limited by or to specific shapes or forms of such containers and solid bodies. In practice, however, suitable such containers are often in the shape or form of a fragmentable cylindrical element or cup open at one of its ends and having a volume appropriate to accommodate the desired load or quantity of igniter material to be therein contained. Further, suitable solid bodies are commonly of a shape or form to complement an open end or opening of or in the associated container.

The solid body 230 desirably functions as a barrier or wall impermeable to the reaction products formed or produced upon actuation of the initiator. This body 230 is preferably made of a material such as rubber.

A surface mount device (SMD) plate 236 (not shown in FIG. 3) is included and serves or acts to position or assisting in positioning the first initiator 214 flat on the SMI assembly board 212 such as to assist in the securing of the first initiator 214 to the board 212 such as by wave soldering or reflow soldering, as described in greater detail below. The SMD plate 236 is preferably made in a thermoplastic material such as, for example, polyphthalamide (PPA).

A first igniter element 240, such as in the form of a bridge element, is disposed within the first container 220 such that upon actuation, the first igniter element 240 is in reaction initiating communication with the first igniter material disposed or contained within the container 220. In particular applications, suitable such igniter elements can include or take the form of a hot wire, a foil bridge or a thin film, for example. It is to be understood, however, that the broader practice of the invention is not necessarily limited to use with specific or particular types or forms of igniter elements.

A first surface mount initiator board 242 is disposed within the container 220 between the first igniter element 240 and the first solid body 230. Such surface mount initiator boards can be suitably made of or from a variety of materials including FR4 glass epoxy resin composites, for example.

The first initiator 214 also includes first and second electrical contacts, 244 and 246, that pass through the first solid body 230 and the first surface mount initiator board 242 in electrical contact with the first igniter element 240. In particular, each of the electrical contacts 244 and 246 has an end at or proximate the generally planar upper face 248 of the surface mount initiator board 242. As shown, connector lead features 250 joining the contacts 244 and 246 with the igniter element 240 in electric transfer communication are desirably surface mounted, e.g., are directly mounted or disposed onto the surface mount initiator board 242.

The second initiator 216 is generally similar to the above-described first initiator 214 and, to avoid unnecessary repetition includes:

a fragmentable generally cylindrical container 260 such as contains a supply of a second igniter material (not shown) such as in the form of an ignition pyrotechnic and which second igniter material may be the same or different in composition, shape, size or form, as compared to the first igniter material;

the first container 260 includes a generally cylindrical side wall 262 with an open first end 264 generally opposite a closed second end 266;

the second end 266 is closed by generally planar upper wall 268;

a first solid cylindrical body 270 closes the container open end 264;

the body 270 has a side wall 272 adapted to mate with the container side wall 262;

adjacent the container open end 264, the container side wall 262 includes a lip portion 274 such as extends about the solid body 270 in a closure securing or retaining alignment;

a surface mount device (SMD) plate 276 is included and serves or acts to position or assisting in positioning the initiator 216 flat on the SMI assembly board 212 such as to assist in the securing of the initiator 216 to the board 212 such as, in this case by wave soldering;

the second container 260 contains a supply of a second igniter material, not shown to facilitate illustration and comprehension of the drawing;

a second igniter element 280, similar to the first igniter element discussed above, is disposed within the second container 260 such that upon actuation, the igniter element 280 is in reaction initiating communication with the igniter material contained or disposed within the container 260;

a second surface mount initiator board 282 is disposed within the container 260 between the igniter element 280 and the solid body 270;

the initiator 216 also includes first and second electrical contacts, 284 and 286, that pass through the solid body 270 and the surface mount initiator board 282 in electrical contact with the igniter element 280;

each of the electrical contacts 284 and 286 (not shown) has an end at or proximate the generally planar upper face 288 of the surface mount initiator board 282; and connector lead features 290 that join the contacts (only shown for contact 284) with the igniter element 280 in electric transfer communication are desirably surface mounted, e.g., are directly mounted or disposed onto the surface mount initiator board 282.

In the initiator assembly 210, the first initiator 214 and the second initiator 216 are shown as desirably wave soldered to the SMI initiator board 212 such as through the inclusion of wave solder joint trace inputs to electrical connections, e.g., interconnects, 294.

As identified above, the SMD plates 236 and 276 can advantageously function to position or assisting in positioning the respective first and second initiators, 214 and 216, flat on the SMI assembly board 212 such as to assist in the securing of the initiators to the board such as by wave soldering or reflow soldering. That is, the SMD plates desirably serve to prevent or avoid the initiator leads being "free floating" and prevent or avoid the initiator being unstable such as to undesirably tip or lean when placed into its designated solder mount location.

The first initiator 214 and the second initiator 216 each include reflow solder joints forming traces between associated electrical contacts and igniter elements.

As will be appreciated by those skilled in the art and guided by the teachings herein provided, in general in order for a discrete electronic component to be "wave solderable", the component generally needs to be able to rest on a respective associated board or plate in such a way as to maintain or hold its respective position during and through the soldering process. In the case of the subject surface mount initiator assemblies, one such mounting configuration would be to have the two firing leads project through a "thru-hole" solder land in the SMI assembly board. The solder wave contacts and connects the leads and the solder land as it goes through the wave soldering process and thus creates the solder joint. In accordance with one preferred embodiment of the invention, the ability of a component to be properly situated in position on an SMI assembly board is realized through the use of a "SMD Plate" which provides a stable surface under the initiator to hold the initiator upright through the process. This same feature of an SMD Plate can be used both for wave soldering and solder reflow processing methods such as herein described and provided.

Initiator assemblies that are wave solderable, however, can significantly expand options for integration of initiators into higher assemblies, such as inflators. For example, working under the assumption that an initiator would need to have a soldered connection with an associated initiator board, there are various techniques by which this can be accomplished. One technique would be to hand solder the initiator onto the board. However, because of the relative high amount of labor associated with such a soldering technique, such method is generally not preferred. Another technique option would be to place the initiator onto the face of a respective SMI assembly board where solder paste had been applied and then put that assembly through a reflow furnace to flow the solder paste to the initiator pins (similar to what would be done with a modern surface mount electrolytic capacitor). A third technique option is a thru-lead connection with the SMI assembly board, giving a manufacturer an option for processing via wave soldering. So the fact that the initiator would be configured in such a way as to allow for wave soldering as an attachment method, creates the desirability.

Figure 5:
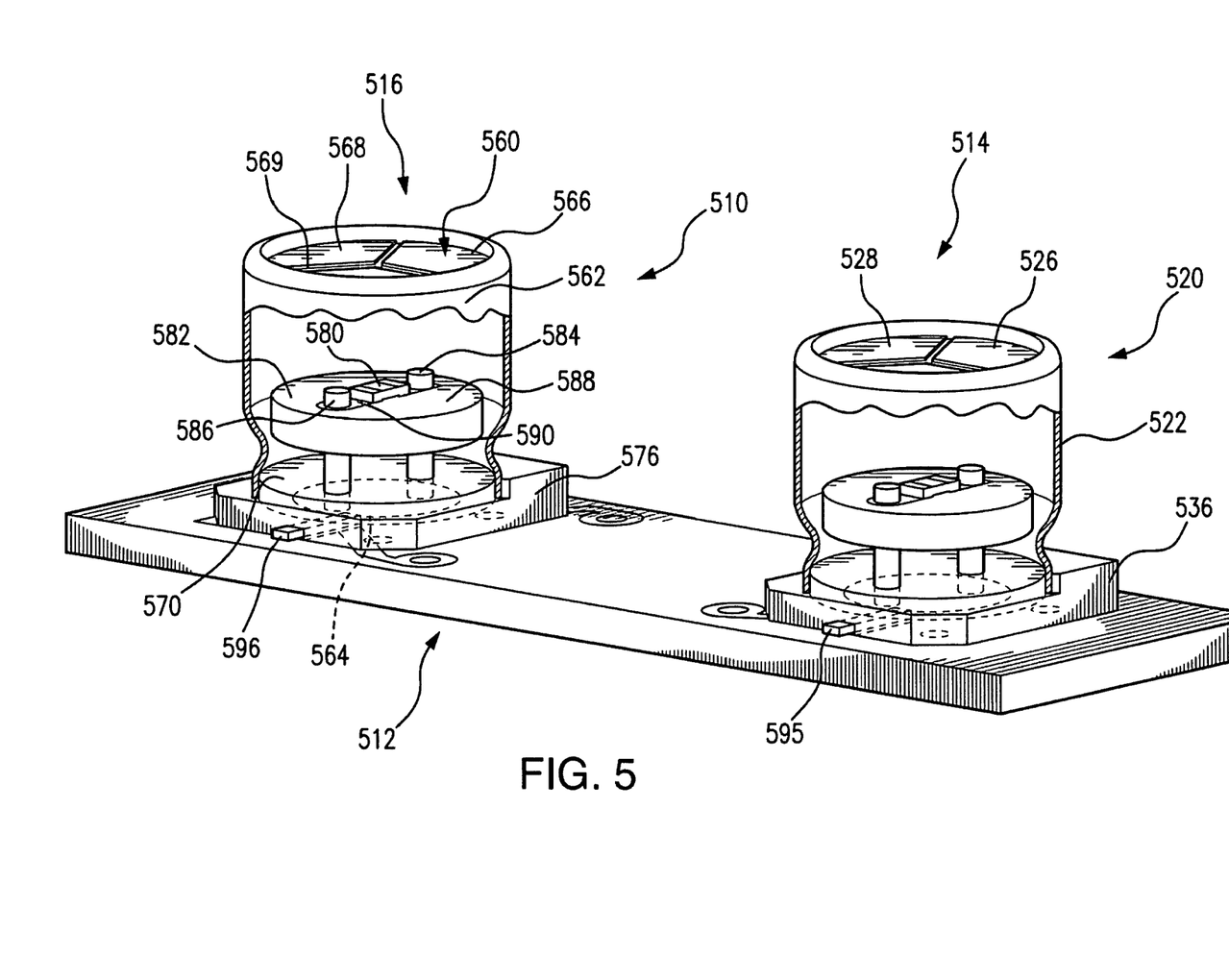
FIG. 5 is a partially in see-through simplified perspective view of an initiator assembly in accordance with another embodiment of the invention.
Figure 6:
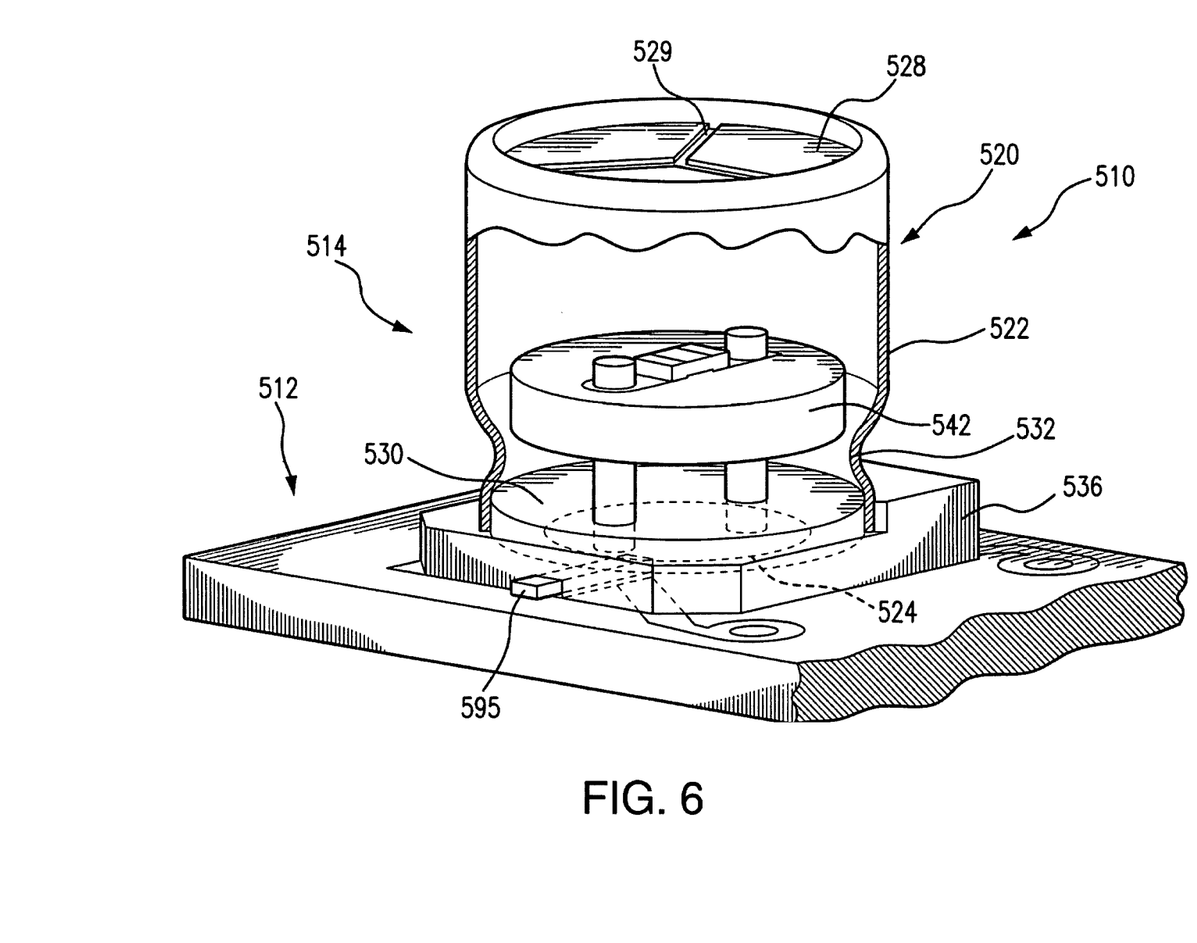
FIG. 6 is an enlarged view of a portion of the initiator assembly shown in FIG. 8.
Figure 7:
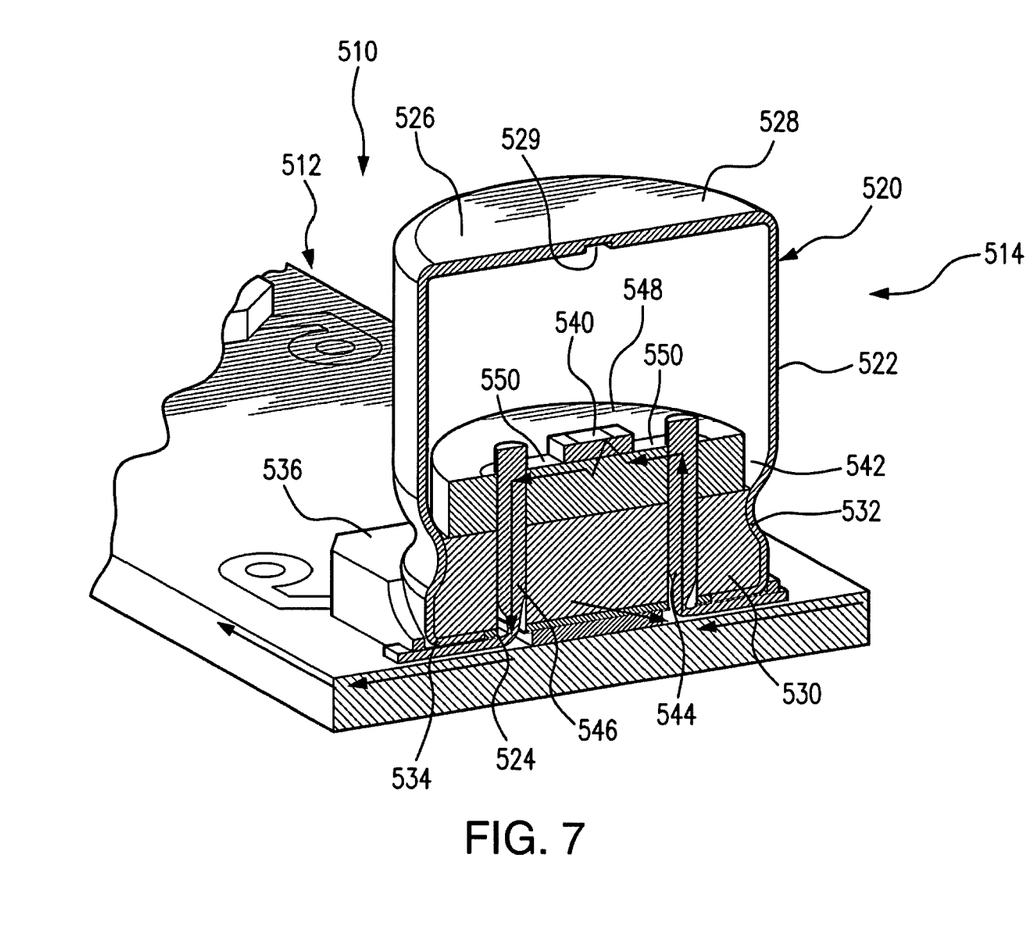
FIG. 7 is a simplified partial sectional view of a portion of the initiator assembly shown in FIG. 5.

Turning to FIGS. 5-7, there is shown or illustrated an initiator assembly, generally designated by the reference numeral 510, in accordance with another embodiment of the invention.

The initiator assembly 510 is in many respects similar to the initiator assembly 210 shown in FIGS. 2-4 and describe above. To simplify and facilitate description and discussion, elements, components and/or features in the initiator assembly 510 that correspond to the above-described elements, components and/or features of the initiator assembly 210 are similarly using similar 500 series reference numerals.

For example, similar to the initiator assembly 210, the initiator assembly 510 includes a SMI initiator board 512 onto which at least a first and a second initiator, 514 and 516, respectively, are surface mounted.

The first initiator 514 includes a fragmentable generally cylindrical first container 520 such as contains a supply of a first igniter material (not shown). The first container 520 includes a generally cylindrical side wall 522 with an open first end 524 generally opposite a second end 526 closed by generally planar upper wall 528. A first solid cylindrical body 530 closes the container open end 524. The body 530 has a side wall 532 adapted to mate with the container side wall 522. Adjacent the container open end 524, the container side wall 522 includes a lip portion 534 such as extends about the solid body 530 in a closure securing or retaining alignment.

The generally planar container upper wall 528, however, is shown as including one or more lines of reduced thickness 529 such as to facilitate desired opening or rupture of the respective container upon actuation of the respective igniter element.

A surface mount device (SMD) plate 536 is included and serves or acts to position or assisting in positioning the first initiator 514 flat on the SMI assembly board 512 such as to assist in the securing of the first initiator 514 to the board 512 such as by wave soldering or reflow soldering, as described in greater detail therein.

A first igniter element 540, such as described above, is disposed within the first container 520 such that upon actuation, the first igniter element 540 is in reaction initiating communication with the first igniter material disposed or contained within the container 520.

A first surface mount initiator board 542 is disposed within the container 520 between the first igniter element 540 and the first solid body 530.

The first initiator 514 includes first and second electrical contacts, 544 and 546, that pass through the solid body 530 and the surface mount initiator board 542 in electrical contact with the igniter element 540. In particular, each of the electrical contacts 544 and 546 has an end at or proximate the generally planar upper face 548 of the surface mount initiator board 542. As shown, connector lead features 550 joining the contacts 544 and 546 with the igniter element 540 in electric transfer communication are desirably surface mounted, e.g., are directly mounted or disposed onto the surface mount initiator board 542.

The initiator 514 differs from the initiator 214 in that the initiator 514 is shown as including respective SMI terminals 595 illustrated as splayed out pins. In this embodiment, such splayed out SMI terminal pins are featured to facilitate and assist in reflow type soldering. This is in contrast to the axial pin terminal design applied in the previously described embodiment and such as may provide a "through-hole" interface with the SMI assembly board such as may be preferred in conjunction with wave soldering.

The second initiator 516 is generally similar to the above-described first initiator 514 and includes:

a fragmentable generally cylindrical container 560;

the container 560 includes a generally cylindrical side wall 562 with an open first end 564 generally opposite a closed second end 566;

the second end 566 is closed by generally planar upper wall 568 having one or more lines of reduced thickness 569 such as to facilitate desired opening or rupture of the respective container upon actuation of the respective igniter element;

a solid cylindrical body 570 closes the container open end 564;

the body 230 has a side wall 572 adapted to mate with the container side wall 562;

adjacent the container open end 564, the container side wall 562 includes a lip portion 574 such as extends about the solid body 570 in a closure securing or retaining alignment;

a surface mount device (SMD) plate 576 is included and serves or acts to position or assisting in positioning the first initiator 514 flat on the SMI assembly board 512 such as to assist in the securing of the first initiator 514 to the board 512 such as by wave soldering or reflow soldering;

the container 560 contains a supply of a second igniter material, not shown to facilitate illustration and comprehension of the drawing;

a second igniter element 580, similar to the first igniter element 540 discussed above, is disposed within the second container 560 such that upon actuation, the igniter element 580 is in reaction initiating communication with the igniter material contained or disposed within the second container 560;

a second surface mount initiator board 582 is disposed within the container 560 between the igniter element 580 and the solid body 570;

the initiator 516 also includes first and second electrical contacts, 584 and 586, that pass through the solid body 570 and the surface mount initiator board 582 in electrical contact with the igniter element 580;

each of the electrical contacts 584 and 586 has an end at or proximate the generally planar upper face 588 of the surface mount initiator board 582;

the connector lead features 590 that join the contacts 584 and 586 with the igniter element 580 in electric transfer communication are desirably surface mounted, e.g., are directly mounted or disposed onto the surface mount initiator board 582; and SMI terminals 596.

In initiator assemblies such as herein provided, the general function of the initiators is to release energy in the form of heat and pressure upon receipt of a constant current pulse stimulus. A current signal received, either through conductive pins or an alternate conductive route, travels through the selected igniter element which, in the case of a resistive element causes it to rapidly heat. That heat is transferred to an associated ignition material such as in the form of a pyrotechnic composition and such as has been consolidated against the igniter element and held with a constant load via the container and its associated attachment features. A function of the surface mount initiator board is to provide an electrical interface between the connector pins in the adjoining connector and the igniter element. It also provides a mounting surface for the igniter element. The solid body, such as in the form of a rubber seal can desirably serve to provide an elastic interface to which the container can be joined or secured, such as by being crimped inward thereagainst. The solid body can also desirably act or serve as a seal against moisture intrusion. The SMD plate provides stability to the initiator in its mount against the adjoining initiator assembly board. The SMD plate also can desirably act or serve as a design control feature to assure that the initiator is electrically insulated from any traces on the initiator assembly board.

As identified above, initiator assemblies such as herein provided can find use in various applications including, for example, such as in or as a part of an automotive airbag inflator device, battery disconnects, trunk lifters, pyro connecting devices, etc.

Figure 8:
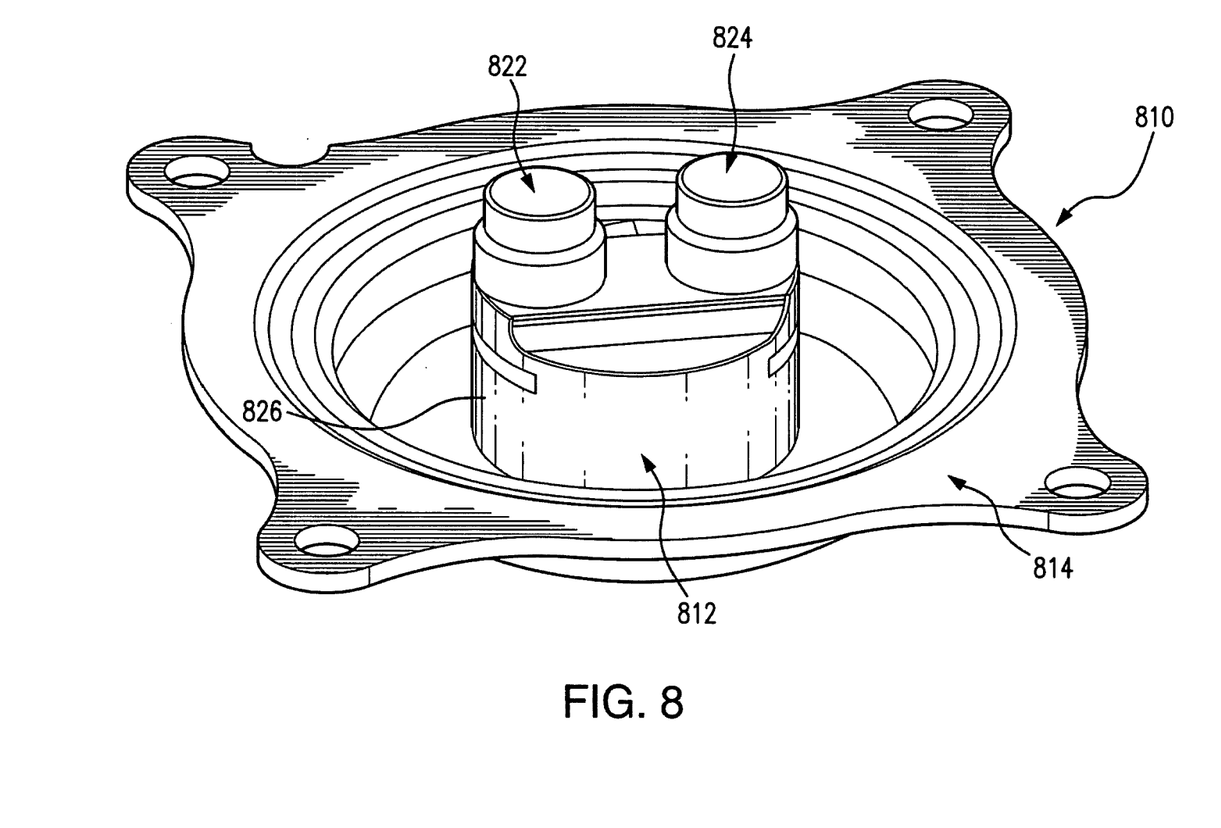
FIG. 8 is a simplified top angled perspective view showing an automotive airbag inflator device base assembly with an initiator assembly integrally molded with the inflator base in accordance with one embodiment of the invention.
Figure 9:
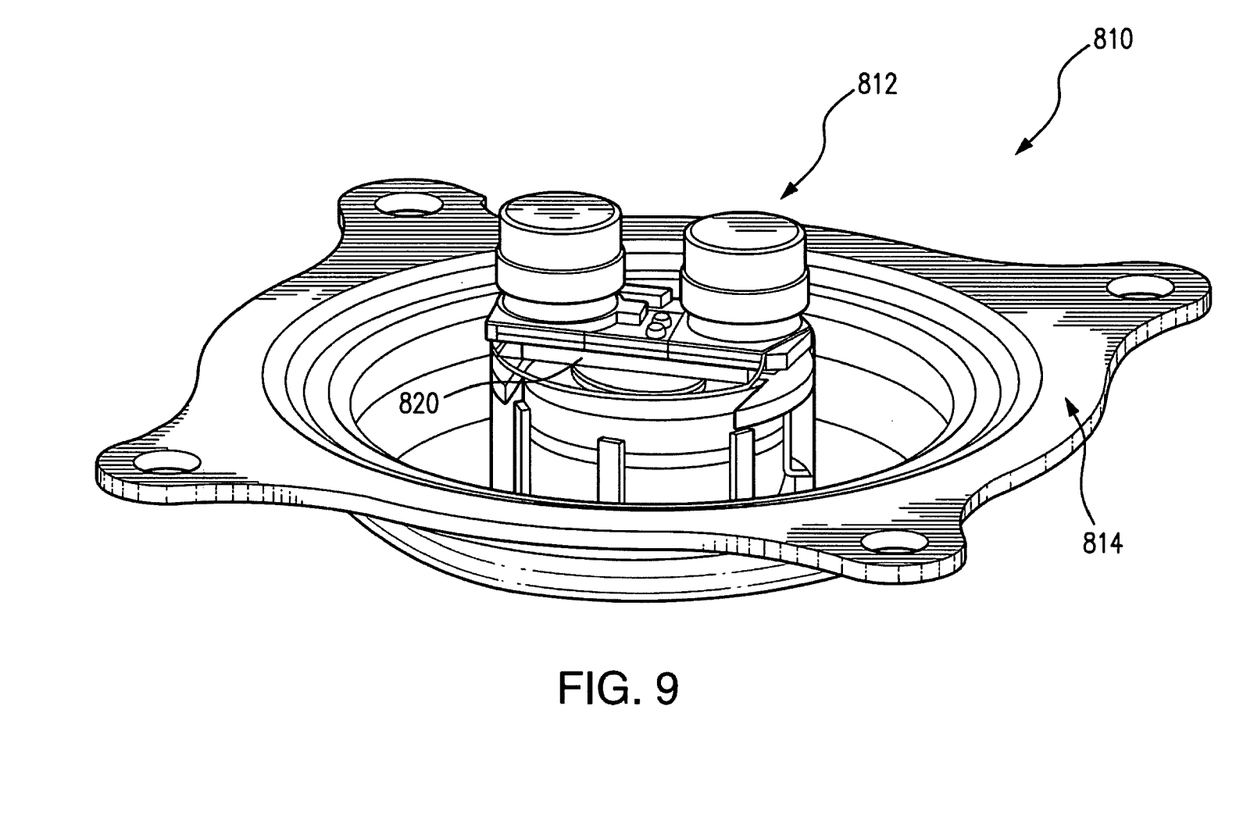
FIG. 9 is a simplified, partially cut-away perspective view of the automotive airbag inflator device base assembly shown in FIG. 8.
Figure 10:
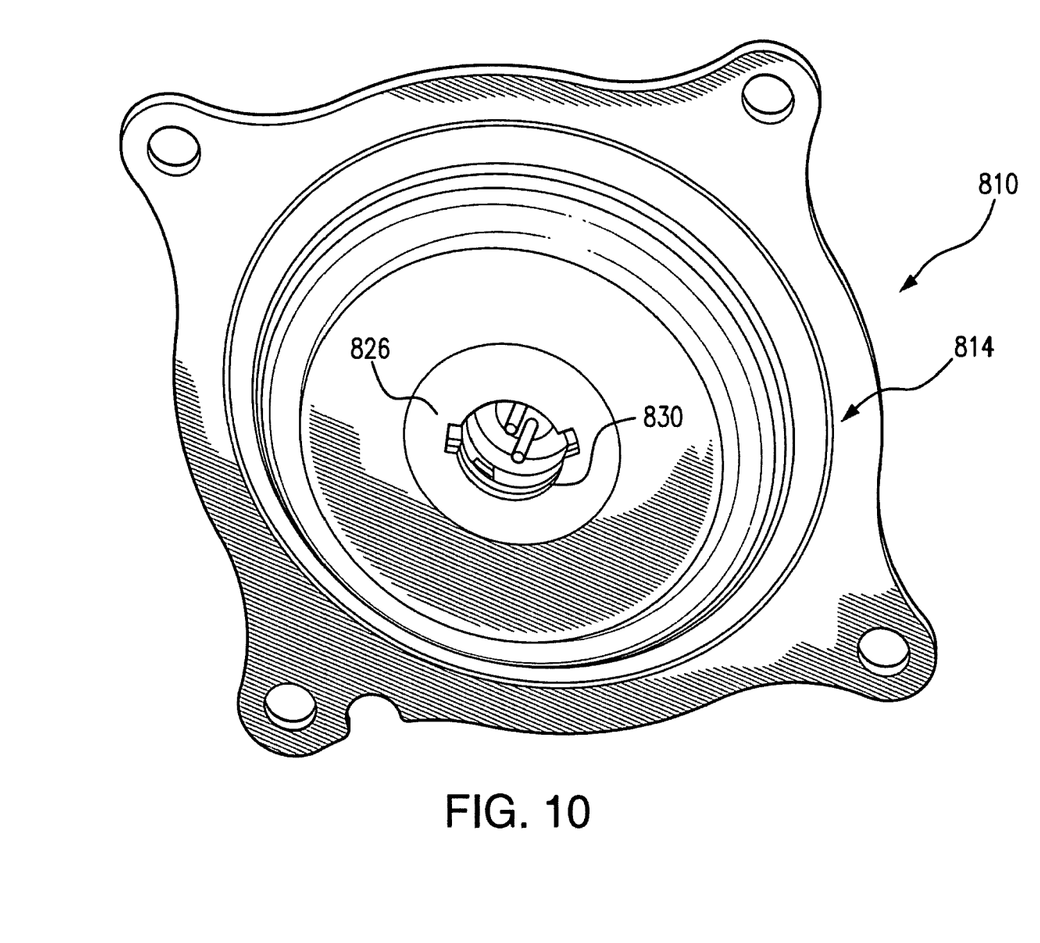
FIG. 10 is a simplified bottom angled perspective view of the automotive airbag inflator device base assembly shown in FIG. 8 and FIG. 9.

Turning to FIGS. 8-10, there is shown an automotive airbag inflator device base assembly 810 with an initiator assembly 812 integrally molded with an inflator base 814, in accordance with one embodiment of the invention. It will be appreciated that other inflator device components such as customary inflator device components such as diffusers, filters, gas generants, outer housing, etc, have been omitted to simplify the figures and facilitate viewing of relevant SMI multi-initiator assembly components.

The initiator assembly 812 is similar to the initiator assembly 210 and forms a subassembly that includes an SMI initiator board 820 onto which at least a first and a second initiator, 822 and 824, respectively, are surface mounted, such as described above.

As shown in FIG. 8. the automotive airbag inflator device base assembly 810 includes an overmolding 826 such as made or formed of materials including but not necessarily limited to nylon 6; nylon 6,12; and polypropylene, for example.

As shown, such as through the inclusion of such an overmolding 826, the initiator assembly 812 can desirably be integrally molded such as to be formed in one part with an automotive airbag inflator device component, in this case the inflator base 814. Those skilled it the art and guided by the teachings herein provided will understand and appreciate that such an integrally molded approach is a relatively low cost approach for creating the embodiment that would interface with the higher level assembly. Injection molding of such a component can desirably reduce either or both processing costs and/or the number of individual components required in an assembly.

As shown, the automotive airbag inflator device base assembly 810 also only includes a single mounting opening 830 for use in association with initiator assembly 812. In contrast, many present day inflator devices require or include multiple mounting openings, e.g., mounting openings for each initiator device therein contained. While molding is a process that has previously been used in certain state of the art single stage inflators, prior dual stage inflators have required the use of welding to join igniter adapters to inflator device chamber walls in order to maintain the necessary degree or level of chamber wall strength required to ensure safe operation of the inflator device upon actuation. Through the need for only a single mounting opening in the inflator chamber wall, inflator chamber wall strength is sufficiently maintained that mold processing can now be advantageously applied to such inflator devices.

Those skilled in the art will understand and appreciate that the invention provides opportunities for significant savings in areas such as ease of manufacture, operation or both with regard to motor vehicle occupant safety restraint systems and components such as inflator devices that significant economic benefits can be realized through the practice of the invention. For example, in typical or common airbag inflator design, the initiator is hermetically sealed via design & process methods and then installed in an inflator assembly which also is hermetically sealed such to ensure proper and desired long term operability. The inclusion of two levels of hemeticity increases product cost. Through the practice and application of the invention, the increase in cost due to the inclusion of the redundancy of having both an internal seal, e.g., an initiator seal, as well as an inflator seal, can be reduced and preferably avoided. That is, as an initiator typically sits within the sealed inflator body for the life of the product, the inflator seal can function to fulfill the same need for the initiator assembly. The approach of integrating the initiator assembly design within the inflator body and removing the need for a redundant hermetic seal can result in reductions in manufacturing cost by eliminating an additional seal such as a laser weld as well as the need for an in-process inspection for that additional seal.

In dual initiator or "smart" applications, the overall cost of the airbag initiating function can also be reduced by integrating both initiator subassemblies into a design in which both initiating devices share a common board mount. For example, with a multi-initiator assembly such as described herein, multiple initiating device(s) is/are installed on a SMI assembly board, such as with previously applied solder paste at the electrical contact location, and then permanently attached through a solder reflow process. Further, the invention permits initiators to be desirably strategically placed within an inflator such as to ignite different stages of the inflator. Moreover, the SMI assembly boards can be appropriately and suitably customized for particular inflator applications such as satisfy or meet the specific or particular needs of an application.

Further cost savings advantages can be realized as inflator assemblies such as herein provided can reduce the need for or eliminate commonly applied initiator design features such as charge holders and gold plating on electrical connections pins, for example.

Cost saving advantages can also be realized as the inflator assemblies in accordance with the invention can utilize components, e.g., cup, SMD Plate, leads, rubber seal and ignition element, such as are already are readily available components used in the electronics industry. By using common or readily accessible commodity components, extremely competitive component pricing can be realized.

Thus the invention provides an initiator assembly wherein one or more separate initiator devices, such as each including a container containing a supply of igniter material and an igniter element in reaction initiating communication with the igniter material, are surface mounted directly onto a SMI assembly board. As will be appreciated, such surface mounting of initiator devices opens up a realm of possibilities that are not currently available with conventional initiator assemblies. For example, in a higher level assembly that requires multiple initiators to drive a higher level device, those initiators can be mounted on the SMI assembly board such as via solder joints rather than individually mounted using conventional means, e.g., welding, crimping, etc. Consequently, attachment process can desirably be simplified and accomplished at a reduced cost, as compared to conventional mounting techniques.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:
1. An initiator assembly comprising:
an SMI assembly board that includes connector leads directly mounted on or disposed on the SMI assembly board and onto which at least a first and a second initiator are surface mounted, the first initiator comprising;
a first container closed by a first solid body, the first container containing a supply of a first igniter material;

a first igniter element disposed within the first container, upon actuation, the first igniter element in reaction initiating communication with the first igniter material;

a first surface mount initiator board disposed between the first igniter element and the first solid body and first initiator first and second electrical contacts passing through the first solid body and the first surface mount initiator board in electrical contact with the first igniter element;

the second initiator comprising;

a second container closed by a second solid body, the second container containing a supply of a second igniter material;

a second igniter element disposed within the second container, upon actuation, the second igniter element in reaction initiating communication with the second igniter material;

a second surface mount initiator board disposed between the second igniter element and the second solid body and second initiator first and second electrical contacts passing through the second solid body and the second surface mount initiator board in electrical contact with the second igniter element.

2. The initiator assembly of claim 1 wherein at least the first initiator is wave soldered to the SMI assembly board.

3. The initiator assembly of claim 2 wherein second initiator is wave soldered to the SMI assembly board.

4. The initiator assembly of claim 2 wherein the first igniter element is reflow soldered to the first surface mount initiator board.

5. The initiator assembly of claim 1 wherein the first igniter element is reflow soldered to the first surface mount initiator board.

6. The initiator assembly of claim 1 wherein the first igniter element is selected from the group consisting of a hot wire, a foil bridge and a thin film.

7. The initiator assembly of claim 6 wherein the second igniter element is selected from the group consisting of a hot wire, a foil bridge and a thin film.

8. The initiator assembly of claim 1 wherein the first igniter material and the second igniter material differ in composition.

9. The initiator assembly of claim 1 wherein the first igniter material and the second igniter material differ in amount.

10. The initiator assembly of claim 1 wherein the first igniter material is an ignition pyrotechnic.

11. The initiator assembly of claim 10 wherein the second igniter material is an ignition pyrotechnic.

12. An automotive airbag inflator device comprising the initiator assembly of claim 1 and with the initiator assembly additionally comprising an overmoulding disposed at least in part thereover.

13. The automotive airbag inflator device of claim 12 wherein the initiator assembly forms a hermetic seal for the inflator device.

14. An automotive airbag inflator device combination comprising:
the initiator assembly of claim 1 in combination with and
an inflator base component.

15. The automotive airbag inflator device combination of claim 14 additionally comprising:
an overmoulding disposed at least in part over the initiator assembly, the overmoulding integrally molding the initiator assembly and the inflator base and forming a hermetic seal of the initiator assembly and the inflator base.

16. The automotive airbag inflator device Combination of claim 14 wherein the inflator base component includes only a Single mounting opening for use in association with the initiator assembly.

17. The initiator assembly of claim 1 wherein at least one of the first and second initiators comprises an axial pin terminal to provide a through-hole interface with the SMI assembly board.

18. The initiator assembly of claim 1 wherein at least one of the first and second initiators comprises splayed out pins SMI terminals.

19. The initiator assembly of claim 1 wherein the SMI assembly board comprises a PC board.

20. A multi-initiator assembly for an automotive airbag inflator device, the multi-initiator assembly comprising:
an SMI assembly board that includes connector leads directly mounted on or disposed on the SMI assembly board an onto which a plurality of initiators are surface mounted, the plurality of initiators including at least a first initiator and a second initiator, the first initiator comprising;
a first container closed by a first solid body, the first container containing a supply of a first igniter material;
a first igniter element disposed within the first container, upon actuation, the first igniter element in reaction initiating communication with the first igniter material;
a first surface mount initiator board disposed between the first igniter element and the first solid body; and
first initiator first and second electrical contacts passing through the first solid body and the first surface mount initiator board in electrical contact with the first igniter element; and the second initiator comprising;
a second container closed by a second solid body, the second container containing a supply of a second igniter material;
a second igniter element disposed within the second container, upon actuation, the second igniter element in reaction initiating communication with the second igniter material;
a second surface mount initiator board disposed between the second igniter element and the second solid body; and
second initiator first and second electrical contacts passing through the second solid body and the second surface mount initiator board in electrical contact with the second igniter element.

21. An automotive airbag inflator device combination comprising:
the multi-initiator assembly of claim 20 in combination with and
an inflator base component.

22. The automotive airbag inflator device combination of claim 21 additionally comprising:
an overmoulding disposed at least in part over the initiator assembly, the overmoulding integrally molding the initiator assembly and the inflator base and forming a hermetic seal of the initiator assembly and the inflator base.

* * * * *